(12) United States Patent
Mann

(10) Patent No.: US 9,176,721 B2
(45) Date of Patent: Nov. 3, 2015

(54) INSTALLING AN APPLICATION INTO A VIRTUALIZED ENVIRONMENT

(75) Inventor: James M. Mann, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/112,566

(22) PCT Filed: Apr. 21, 2011

(86) PCT No.: PCT/US2011/033367
§ 371 (c)(1),
(2), (4) Date: Oct. 18, 2013

(87) PCT Pub. No.: WO2012/145002
PCT Pub. Date: Oct. 26, 2012

(65) Prior Publication Data
US 2014/0040878 A1    Feb. 6, 2014

(51) Int. Cl.
*G06F 9/455* (2006.01)
*G06F 9/445* (2006.01)

(52) U.S. Cl.
CPC .............. *G06F 8/61* (2013.01); *G06F 9/45558* (2013.01)

(58) Field of Classification Search
CPC ... G06F 9/45558; G06F 9/44505; G06F 8/61; G06F 8/63; G06F 21/62; G06F 21/78; G06F 21/88
See application file for complete search history.

(56) References Cited

U.S. PATENT DOCUMENTS

| | | | |
|---|---|---|---|
| 7,681,134 B1 | 3/2010 | Grechishkin et al. | |
| 7,805,722 B2 | 9/2010 | Mori et al. | |
| 7,827,548 B1 | 11/2010 | Anderson et al. | |
| 8,631,131 B2* | 1/2014 | Kenneth et al. | 709/226 |
| 8,826,269 B2* | 9/2014 | Li et al. | 718/1 |
| 8,949,585 B2* | 2/2015 | Hiltgen et al. | 713/2 |
| 9,021,005 B2* | 4/2015 | Nath et al. | 718/103 |
| 2001/0025200 A1 | 9/2001 | Aramaki et al. | |
| 2005/0091269 A1 | 4/2005 | Gerber et al. | |
| 2005/0216909 A1 | 9/2005 | James, Jr. et al. | |
| 2006/0200818 A1 | 9/2006 | Oprea et al. | |
| 2007/0143446 A1 | 6/2007 | Morris | |
| 2008/0098391 A1 | 4/2008 | Medvedev | |
| 2009/0282404 A1* | 11/2009 | Khandekar et al. | 718/1 |
| 2010/0037235 A1 | 2/2010 | Larimore | |
| 2010/0138823 A1 | 6/2010 | Thornley | |
| 2011/0154320 A1* | 6/2011 | Verma | 718/1 |
| 2012/0110328 A1* | 5/2012 | Pate et al. | 713/165 |

(Continued)

FOREIGN PATENT DOCUMENTS

| | | |
|---|---|---|
| CN | 101655798 | 2/2010 |
| CN | 101833462 | 9/2010 |
| CN | 101937351 | 1/2011 |

OTHER PUBLICATIONS

Potter et al., Mobitopolo: a portable infrastructure to facilitate flexible deployment and migration of distributed applications with virtual topologies, Aug. 2009, 9 pages.*

Konstantinou et al., An architecture for virtual solution composition and deployment in infrastructure clouds, Jun. 2009, 9 pages.*

(Continued)

*Primary Examiner* — Thuy Dao
(74) *Attorney, Agent, or Firm* — Trop, Pruner & Hu

(57) ABSTRACT

An electronic device has a plurality of virtualized environments. Selection of an application of an application store is received, and a virtualized environment is identified for installing the application selected from the application store.

14 Claims, 3 Drawing Sheets

(56) References Cited

U.S. PATENT DOCUMENTS

2012/0266161 A1* 10/2012 Baron .............................. 718/1
2015/0089172 A1* 3/2015 Kulkarni ...................... 711/162

OTHER PUBLICATIONS

International Searching Authority, International Search Report and Written Opinion, Appln No. PCT/US2011/033367, Date of Mailing Jan. 2, 2012, 8 p.

* cited by examiner

INSTALLING AN APPLICATION INTO A VIRTUALIZED ENVIRONMENT

BACKGROUND

A physical machine, such as a computer or other type of electronic device, can be configured to include multiple virtualized environments that can execute respective different guest operating systems. Such virtualized environments are also sometimes referred to as virtual machines. The presence of multiple virtualized environments in a physical machine allows for applications written for different operating systems to be executed in the different virtualized environments on the same physical machine.

BRIEF DESCRIPTION OF THE DRAWINGS

Some embodiments are described with respect to the following figures.

DETAILED DESCRIPTION

Figure 1A:
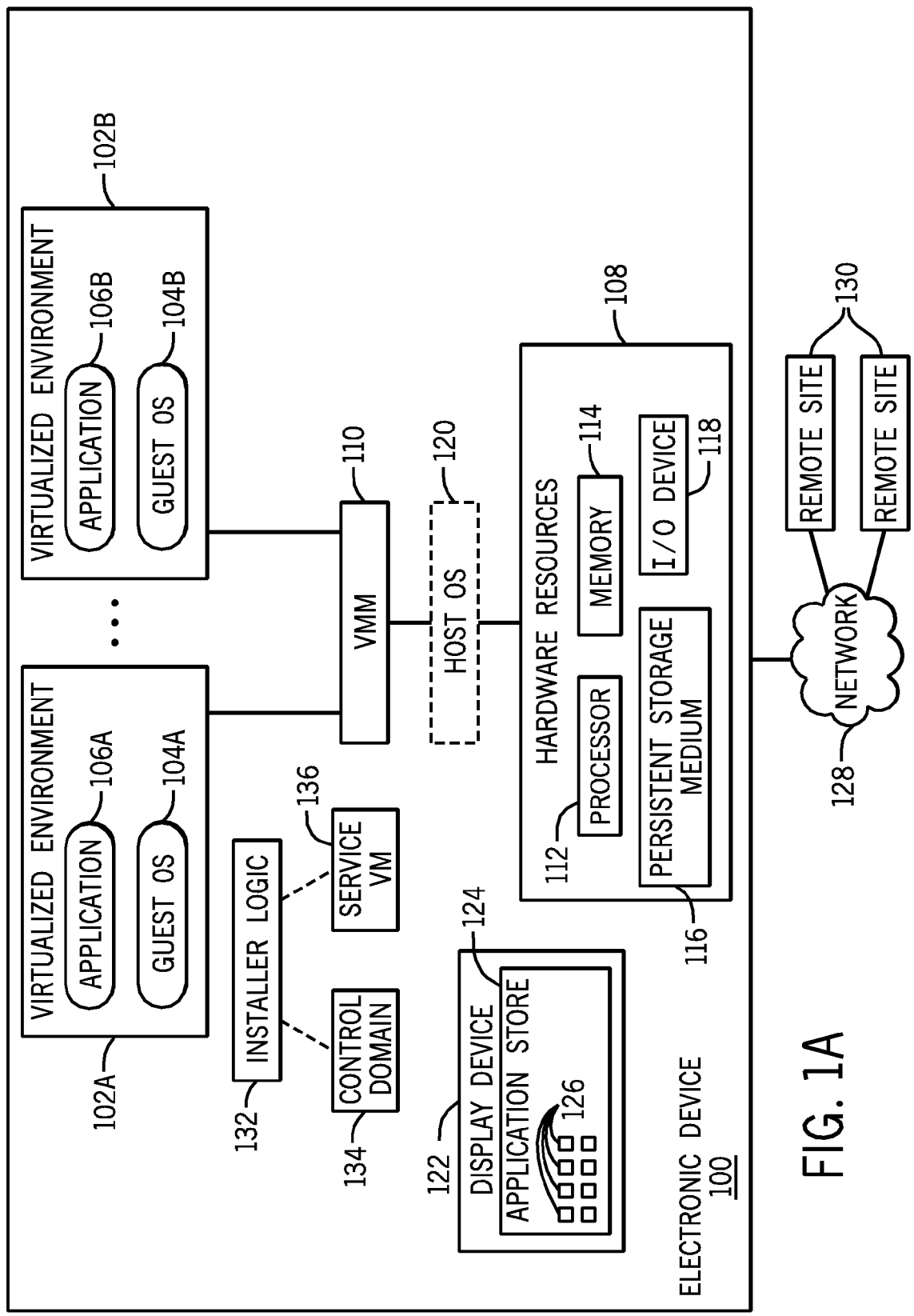
FIGS. 1A-1B are block diagrams of example systems according to various implementations.

In electronic devices, graphical representations of application stores that contain items representing respective different applications can be presented. A user can select one or multiple ones of the items in the application store to cause the respective application(s) to be installed into the electronic device. Examples of electronic devices include computers (desktop computers, notebook computers, tablet computers, etc.), personal digital assistants (PDAs), mobile telephones, electronic appliances, or other types of electronic devices.

The applications of the application store that can be installed into an electronic device can be located at various remote sites, such as websites or application servers of vendors that offer the applications for sale or free download. When a user selects an item in the application store corresponding to a given application, the electronic device communicates with the remote site over a network to download the code associated with the given application for installation in the electronic device. The "code" associated with the given application refers to machine-readable instructions that are executable on the electronic device once the machine-readable instructions are installed in the electronic device. The machine-readable instructions can be in the form of compiled code, a script, or another form of code. "Installing" an application into an electronic device refers to obtaining the code of the application from a source (such as a remote site) and placing the code in the electronic device in a state that allows the code to be executed when invoked, such as by a user or by an application. The code is placed into appropriate location(s) of the electronic device to allow the code to be executed when invoked. Prior to installing the code, the code did not previously exist in the electronic device in a state that allows the code to be executed in response to invocation of the code.

In some implementations, an electronic device can be configured with multiple virtualized environments (also referred to as "virtual machines"). A "virtualized environment" or "virtual machine" refers to an arrangement of components for virtualizing or emulating an actual machine. In the ensuing discussion, the terms "virtualized environment" and "virtual machine" are used interchangeably. As discussed further below, the presence of multiple virtualized environments in the electronic device presents a challenge to a user when the user desires to install an application into the electronic device. For example, the application can be written for a particular operating system, such that the application has to be installed in a virtualized environment containing the particular operating system. This can be challenging to the user if the user were to manually determine which of multiple virtualized environments is the appropriate one for installation of the application.

The components of each virtualized environment can include a guest operating system and one or multiple applications capable of operating within the guest operating system. Different virtualized environments in the electronic device can include different types of guest operating systems (e.g., Unix operating system, Linux operating system, Windows® operating system, WebOS, or other types of operating systems). The presence of multiple virtualized environments in an electronic device allows for concurrent execution, in the electronic device, of applications designed for different operating systems.

In an electronic device that has multiple virtualized environments, it is possible for an application store presented by such electronic device to include applications for different types of operating systems. Presenting applications for different types of operating systems within a common application store enhances the user experience, as compared to an arrangement in which different individual application stores are provided for the different types of operating systems. A user can easily browse through the common application store to find applications that may be of interest to the user.

In accordance with some implementations, techniques or mechanisms are provided to allow for automatic installation of a selected application (selected by a user in an application store that contains applications for different types of operating systems) into a corresponding virtualized environment that includes the guest operating system compatible with the selected application. By using techniques or mechanisms according to some implementations, the user does not have to manually perform an analysis to determine which of multiple virtualized environments is the appropriate one for installation of the selected application, which can be challenging for a user without proper training or guidance.

FIG. 1A is a block diagram of an example electronic device 100 that includes multiple virtualized environments (or virtual machines) 102A, 102B. Although just two virtualized environments are depicted in FIG. 1A, it is noted that in alternative implementations, additional virtualized environments can be provided in the electronic device 100. As depicted in FIG. 1A, the virtualized environment 102A includes a guest operating system 104A and an application 106A designed to run on the guest operating system 104A. Similarly, the virtualized environment 102B includes a guest operating system 104B and an application 106B designed to run on the guest operating system 104B. The guest operating system 104B is of a different type from the guest operating system 104A.

In some examples, hardware resources 108 of the electronic device 100 include a processor 112, a memory 114, a persistent storage media 116, and an input/output (I/O) device 118. Note that although reference is made to processor 112, memory 114, persistent storage medium 116, and I/O device 118 in the singular sense, the hardware resources 108 can also include multiple processors, memories, persistent storage media, and/or I/O devices.

Virtualization of the hardware resources 108 of the electronic device is provided by a virtual machine monitor (VMM) 110. A VMM is also referred to as a hypervisor. The VMM 110 manages the sharing (by the virtualized environments 102A, 102B) of the hardware resources 108. The VMM 110 virtualizes the hardware resources 108, and intercepts requests for such hardware resources from the guest operating systems 104A, 104B.

Effectively, the VMM 110 provides an interface between the guest operating system of each virtualized environment and the underlying hardware resources 108. In some examples, the interface provided by the VMM 110 to a guest operating system is designed to emulate the interface provided by the actual hardware resources 108.

In some implementations, the VMM 110 is a type 1 (or native, bare metal) VMM or hypervisor that is configured to run directly on the hardware resources 108 to control the hardware resources 108 and to interact with the guest operating systems. In other implementations, the VMM 110 can be a type 2 (or hosted) VMM or hypervisor that runs on a host operating system. For example, a host operating system 120 is depicted in dashed profile in FIG. 1A. If the VMM 110 is a hosted VMM, then the host operating system 120 would be present for hosting the VMM 110. On the other hand, if the VMM 110 is a type 1 VMM, the host operating system 120 would be omitted.

The electronic device 100 also includes a display device 122. The display device 122 interacts with a graphics controller (which can be one of the I/O devices 118) of the hardware resources 108. The display device 122 can be controlled to present a graphical representation of an application store 124. The application store 124 includes items 126 (such as icons) that represent respective applications that are selectable by a user to cause installation of the respective selected applications.

Note that the I/O devices 118 can also include a network interface controller to allow the electronic device 100 to communicate over a network 128 with respective remote sites 130 (e.g., websites, application servers, etc.). Each remote site 130 can store code corresponding to one or multiple ones of the applications represented in the application store 124. In response to selection of an application in the application store 124, the electronic device 100 communicates over the network 128 with a respective remote site 130, to cause the code corresponding to the selected application to be downloaded to the electronic device 100 for installation in the electronic device 100.

Installation of a selected application from the application store 124 can be controlled by installer logic 132 that is executed in the electronic device 100. The installer logic 132 can be considered to be an application store proxy (proxy for the application store 124). In some implementations, the application store connection is proxied through the virtualization infrastructure of the electronic device 100. Proxying the application store connection refers to an operation in which an installation task associated with the application store (such as an installation task responsive to user selection of an application in the application store 124) is forwarded to the installer logic 132 that is part of the virtualization infrastructure of the electronic device 100.

For example, the installer logic 132 can be part of a control domain 134 that is in the virtualization infrastructure. The control domain can be domain 0, which is the first domain launched when the electronic device 100 initially starts up. Note that the domain 0 concept is applicable for some types of VMMs 110. Domain 0 includes special management privileges and can have direct access to the hardware resources 108. Domain 0 can be considered an administrative virtual machine.

In other examples, the installer logic 132 can be part of a service virtual machine 136 (that is configured to perform various administrative tasks in the electronic device 100). As yet another alternative, the installer logic 132 can be part of one of the virtualized environments 102A, 102B.

Figure 1B:
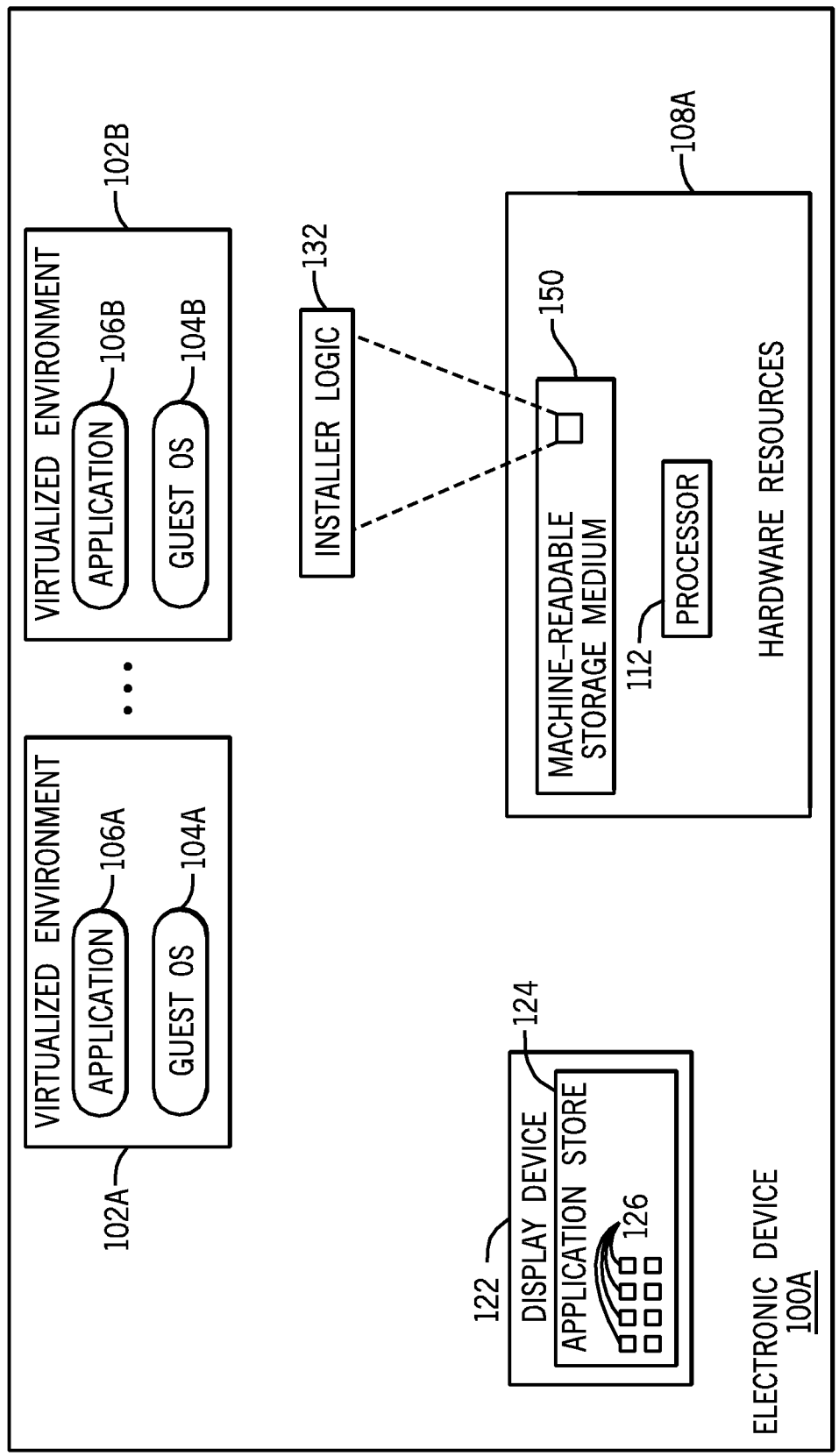

FIG. 1B shows a simplified electronic device 100A according to alternative implementations. Elements in the electronic device 100A that are present in the electronic device 100 of FIG. 1A are labeled with the same reference numerals. As shown in FIG. 1B, the electronic device 100A includes virtualized environments 102A and 102B, along with the display device 122 that is able display a representation of the application store 124.

Hardware resources 108A of the electronic device 100A include a machine-readable storage medium 150 and the processor 112. As depicted, in some implementations, the installer logic 132 according to some implementations is initially stored in the machine-readable storage medium 150 and loaded for execution on the processor 112.

Figure 2:
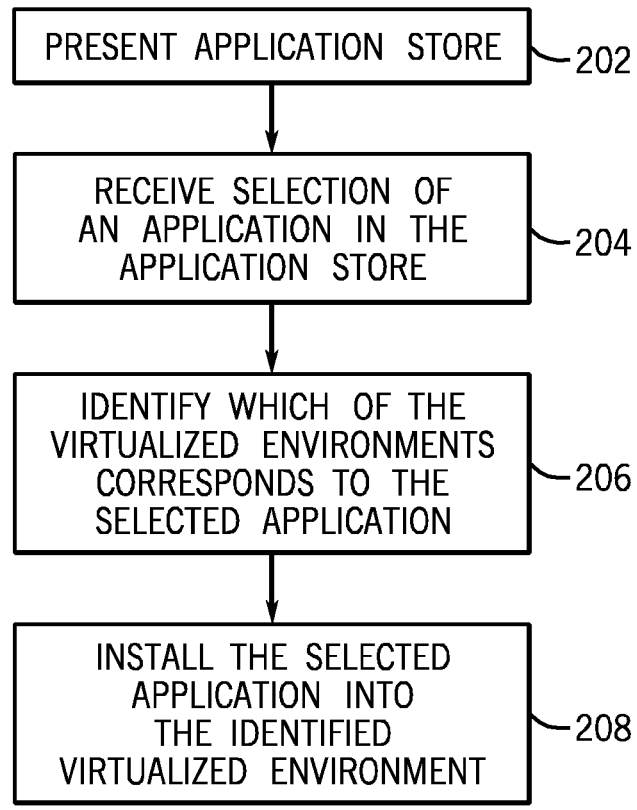
FIG. 2 is a flow diagram of a process of loading an application from an application store, according to some implementations.

FIG. 2 is a process performed by the electronic device 100, in accordance with some implementations. A graphical representation of the application store 124 (FIG. 1A or 1B) is presented (at 202) for display. In some examples, the application store 124 can be presented by an application store application (not shown) in the electronic device 100. The application store application can be part of one of the virtualized environments 102A, 102B, or can be part of the service virtual module 136, or can be part of another module in the electronic device 100.

The installer logic 132 receives (at 204) selection of an application in the application store 124. In response to the selection, the installer logic 132 identifies (at 206) which of the multiple virtualized environments 102A, 102B corresponds to the selected application. The selected application is then installed (at 208) into the identified virtualized environment.

Note that in some cases, the identifying performed at 206 can include identifying multiple virtualized environments that are appropriate for installation of the selected application (in other words, the selected application is compatible with each of the guest operating systems in the identified multiple virtualized environments). In such cases, the installer logic 132 can prompt the user to select which of the identified multiple virtualized environments to install the selected application into. Alternatively, the installer logic 132 can use one or multiple predefined criteria to automatically select from among the identified multiple virtualized environments. For example, the installer logic 132 can select: (1) a most recently used of the identified multiple virtualized environments, or (2) the one of the identified multiple virtualized environments that is currently in the foreground or that is active. Since there are multiple virtualized environments, some of the virtualized environments may be actively performing tasks in the electronic device (the applications and/or operating systems in such virtualized environments are actively executing and thus using the hardware resources of the electronic device). Such virtualized environments are considered to be in the foreground or active. In contrast, others of the virtualized environments can be dormant (the applications and/or operating systems are idle and not using hardware resources of the electronic device). Other criteria for selecting from among the identified multiple virtualized environments can be used in other examples.

Once the installer logic 132 has applied the predefined criterion (or criteria) to select from among the identified multiple virtualized environments, the installer logic 132 can automatically install the selected application into the selected virtualized environment without further input from the user. Alternatively, the installer logic 132 can first present to the user the selected virtualized environment as a recommendation or suggestion, along with the identified multiple virtualized environments. The user can choose to accept or disregard the recommendation or suggestion.

The identification (206 in FIG. 2) of the virtualized environment(s) in which a selected application is to be installed can be based on one of several different mechanisms. For example, metadata can be associated with an application in the application store. The metadata can be included in a wrapper or installer of the application. A wrapper refers to logic associated with the application that is configured to invoke the application when the wrapper executes. An installer of the application refers to logic associated with the application that is configured to install the application in a system when the installer executes. The metadata can identify that the particular application is associated with a given operating system, so that the installer logic 132 is able to decide, based on the metadata, which virtualized environment 102A, 102B is the appropriate virtualized environment to install the selected application (by matching the operating system indicated by the metadata with the guest operating system in each virtualized environment).

Figure 3:
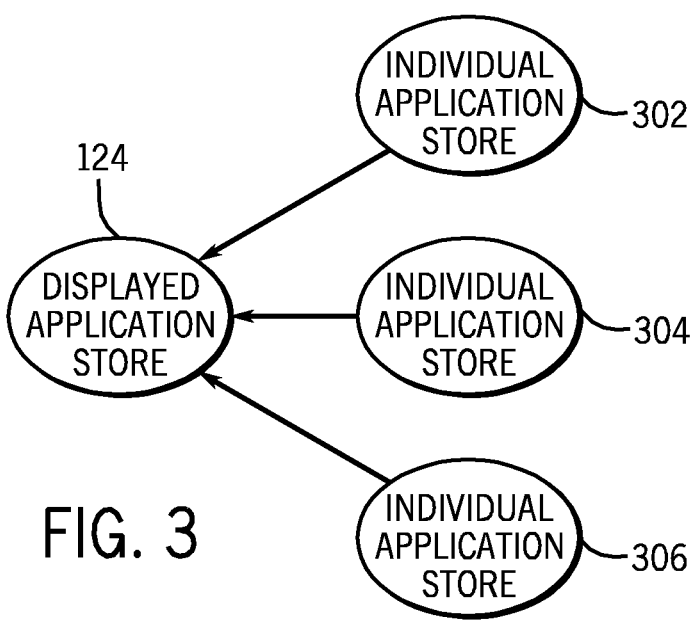
FIG. 3 is a block diagram of components of a system according to further implementations.

Another mechanism to allow for association of applications with respective virtualized environments 102A, 102B is to include respective different applications (designed for different types of operating systems) in respective unique, individual application stores, such as individual application stores 302, 304, and 306 depicted in FIG. 3. Although three individual application stores 302, 304, and 306 are shown in FIG. 3, note that different numbers of individual applications stores can be used in other examples.

The individual application store 302 contains applications for a first type of operating system, the individual application store 304 contains applications for a second type of operating system, and the individual application store 306 contains applications for a third type of operating system. The content of the individual application stores 302, 304, and 306 can be combined for presentation in the displayed application store 124. In implementations according to FIG. 3, the displayed application store 124 can be considered to be a virtual or abstract application store that combines the content of the individual application stores 302, 304, and 306.

When an application is selected in the displayed application store 124, the installer logic 132 is able to identify the source of the selected application as being one of the individual application stores 302, 304, and 306. Based on identifying the respective individual application store as being the source, the installer logic 132 is able to determine which virtualized environment(s) is (are) the correct virtualized environment(s) to install the selected application.

As yet another alternative, extensions of names of applications in the application store 124 can be used for identifying the appropriate virtualized environment(s) for installing a selected application. For example, an application name that has an .exe extension indicates that the application is for a Windows® operating system, and thus should be installed in a virtualized environment that includes a Windows® operating system. As another example, an application name with a .rpm or .yum extension can indicate that the application is associated with a Linux operating system, and thus should be installed in a virtualized environment that contains a Linux operating system.

Although many extensions are unique and unambiguous (with respect to which operating system the application is designed for), there are other extensions that can potentially be ambiguous. Examples of such ambiguous extensions include .xml or .html. Applications with these extensions can be plug-ins that potentially can be installed in one of several different virtualized environments having different operating systems. To resolve this ambiguity, one of the foregoing techniques can be used, such as the technique that employs metadata associated with the application or the technique in which applications for different operating systems are stored in different individual application stores.

Alternatively, in cases where an extension is ambiguous, a prompt can be presented to the user to allow the user to select which virtualized environment is appropriate for installing the selected application.

By using techniques or mechanisms according to some implementations, applications designed for different types of operating systems can be presented in a common or shared application store, while still allowing for the ability to install a selected application into the appropriate virtualized environment in an electronic device that has multiple virtualized environments.

Machine-readable instructions of modules described above (including modules depicted in FIG. 1A or 1B) are executed on a processor(s) (such as 112 in FIG. 1A or 1B). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of an electronic device, comprising:
presenting a representation of an application store at the electronic device, wherein the electronic device has a plurality of virtualized environments each configured with a respective different type of operating system;
receiving selection of an application of the application store;
identifying which of the plurality of virtualized environments corresponds to the application, wherein the identifying comprises:
identifying multiple virtualized environments of the plurality of virtualized environments as being appropriate to install the application; and
performing an action to select from among the multiple virtualized environments for installing the application, wherein the action comprises at least one selected from among:
prompt a user for selection of one of the multiple virtualized environments;
use at least one criterion to automatically select from the multiple virtualized environments; and
use at least one criterion to select from the multiple virtualized environments, and present the selected one of the multiple virtualized environments in a prompt to a user as a suggested virtualized environment for installing the application; and
installing the application into the identified virtualized environment.

2. The method of claim 1, wherein the identifying comprises accessing metadata in a wrapper or installer of the application.

3. The method of claim 1, wherein the identifying comprises accessing information relating to a source of the application.

4. The method of claim 3, wherein accessing the information relating to the source comprises accessing information indicating which of multiple individual application stores the application is associated with.

5. The method of claim 1, wherein the receiving, the identifying, and the installing are performed by logic in a virtualization infrastructure of the electronic device.

6. The method of claim 5, wherein the virtualization infrastructure includes a control domain or a virtual machine.

7. An article comprising at least one non-transitory machine-readable storage medium storing instructions that upon execution cause an electronic device having a processor to:
present a representation of an application store at the electronic device, wherein the electronic device has a plurality of virtualized environments each configured with a respective different type of operating system;
receive selection of an application of the application store;
identify which of the plurality of virtualized environments corresponds to the application, the identifying comprising:
identifying multiple virtualized environments of the plurality of virtualized environments as being appropriate to install the application; and
performing an action to select from among the multiple virtualized environments for installing the application, wherein the action comprises at least one selected from among:
prompt a user for selection of one of the multiple virtualized environments;
use at least one criterion to automatically select from the multiple virtualized environments; and
use at least one criterion to select from the multiple virtualized environments, and present the selected one of the multiple virtualized environments in a prompt to a user as a suggested virtualized environment for installing the application; and
install the application into the identified virtualized environment.

8. The article of claim 7, wherein the identifying comprises accessing information associated with the selected application, wherein the accessed information comprises at least one selected from among:
metadata in a wrapper or installer of the application;
a source of the application; and
an extension of a name of the application.

9. The article of claim 8, wherein the accessed information comprises information identifying a given type of operating system that the application is compatible with.

10. An electronic device comprising:
at least one processor;
a plurality of virtualized environments having respective guest operating systems; and
installer logic to:
receive selection of an application presented by an application store having plural applications;
access information associated with the selected application to identify in which of the virtualized environments the selected application is to be installed, where the installer logic is to identify in which of the virtualized environments the selected application is to be installed by:
identifying multiple ones of the plurality of virtualized environments as being appropriate to install the selected application; and
performing an action to select from among the multiple virtualized environments for installing the selected application, wherein the action comprises at least one selected from among:
prompt a user for selection of one of the multiple virtualized environments;
use at least one criterion to automatically select from the multiple virtualized environments; and
use at least one criterion to select from the multiple virtualized environments, and present the selected one of the multiple virtualized environments in a prompt to a user as a suggested virtualized environment for installing the selected application; and
install the selected application in the identified virtualized environment.

11. The electronic device of claim 10, wherein the installer logic is part of a virtualization infrastructure of the electronic device.

12. The electronic device of claim 10, wherein the accessed information comprises at least one selected from among:
metadata in a wrapper or installer of the selected application;
a source of the selected application; and
an extension of a name of the selected application.

13. The electronic device of claim 10, wherein the application store is a shared application store having the applications that are associated with different types of operating systems, the electronic device further comprising:
individual application stores each containing a respective subset of the applications, wherein each of the individual application stores is associated with a respective one of the different types of operating system.

14. The electronic device of claim 10, wherein the accessed information comprises information identifying a given type of operating system that the selected application is compatible with, and the identifying of which of the virtualized environments the selected application is to be installed in comprises matching the given type of operating system identified in the accessed information with a type of operating system in each of the virtualized environments.

* * * * *